United States Patent
Furey

(10) Patent No.: US 7,813,646 B2
(45) Date of Patent: Oct. 12, 2010

(54) POWER OVER OPTICAL FIBER SYSTEM

(75) Inventor: James Furey, Anaheim, CA (US)

(73) Assignee: RLH Industries, Inc, Orange, CA (US)

( * ) Notice: Subject to any disclaimer, the term of this patent is extended or adjusted under 35 U.S.C. 154(b) by 609 days.

(21) Appl. No.: 11/776,527

(22) Filed: Jul. 11, 2007

(65) Prior Publication Data

US 2009/0016715 A1 Jan. 15, 2009

(51) Int. Cl.
*H04B 10/08* (2006.01)
(52) U.S. Cl. .................. 398/140; 398/135; 398/137
(58) Field of Classification Search ............ 98/135, 98/140, 137
See application file for complete search history.

(56) References Cited

U.S. PATENT DOCUMENTS 3,810,044 A * 5/1974 Woodbury et al. ........... 372/33
4,434,510 A * 2/1984 Lemelson ................... 398/168
4,710,977 A * 12/1987 Lemelson ................... 398/171

(Continued)

OTHER PUBLICATIONS

State Compensation Insurace Fund, "Laser Safety", 2000, (http://www.statefundca.com/safety/safetymeeting/SafetyMeetingArticle.aspx?ArticleID=216).*

(Continued)

*Primary Examiner*—Ken N Vanderpuye
*Assistant Examiner*—Tanya Ngo
(74) *Attorney, Agent, or Firm*—Lawrence S. Cohen

(57) ABSTRACT

A system for providing power to remote equipment where a transmit unit having lasers transmits laser light over optical fiber to a receive unit having photovoltaic receivers. The photovoltaic receivers convert the laser light to electrical energy for the remote equipment. The receive unit also sends a feedback signal to the transmit unit which the transmit unit uses to determine whether the lasers should be enabled for full power.

21 Claims, 5 Drawing Sheets

U.S. PATENT DOCUMENTS

| | | | | |
|---|---|---|---|---|
| 4,834,805 | A * | 5/1989 | Erbert | 136/246 |
| 4,905,309 | A * | 2/1990 | Maisonneuve et al. | 398/168 |
| 4,912,522 | A * | 3/1990 | Oates et al. | 398/107 |
| 4,928,319 | A * | 5/1990 | Pitt et al. | 398/171 |
| 4,998,294 | A * | 3/1991 | Banks et al. | 398/171 |
| 5,099,144 | A * | 3/1992 | Sai | 250/551 |
| 5,119,679 | A * | 6/1992 | Frisch | 73/705 |
| 5,193,201 | A * | 3/1993 | Tymes | 708/191 |
| 5,206,885 | A * | 4/1993 | DeLuca et al. | 375/342 |
| 5,271,075 | A * | 12/1993 | Gfeller et al. | 385/20 |
| 5,291,607 | A * | 3/1994 | Ristic et al. | 713/300 |
| 5,453,866 | A * | 9/1995 | Gross | 398/110 |
| 5,528,409 | A * | 6/1996 | Cucci et al. | 398/15 |
| 5,664,035 | A * | 9/1997 | Tsuji et al. | 385/24 |
| 5,796,890 | A * | 8/1998 | Tsuji et al. | 385/24 |
| 5,859,719 | A * | 1/1999 | Dentai et al. | 398/141 |
| 6,037,676 | A * | 3/2000 | Foree | 307/10.7 |
| 6,441,936 | B1 * | 8/2002 | Kinstler | 398/106 |
| 6,904,295 | B2 * | 6/2005 | Yang | 455/522 |
| 7,026,744 | B2 * | 4/2006 | Humpston et al. | 310/318 |
| 7,359,647 | B1 * | 4/2008 | Faria et al. | 398/171 |
| 7,388,892 | B2 * | 6/2008 | Nishiyama et al. | 372/38.02 |
| 7,440,699 | B1 * | 10/2008 | Stewart et al. | 398/116 |
| 7,660,534 | B2 * | 2/2010 | Al-Chalabi | 398/171 |
| 7,696,901 | B2 * | 4/2010 | Wilson et al. | 340/854.7 |
| 2004/0008996 | A1 * | 1/2004 | Aronson et al. | 398/202 |
| 2005/0226625 | A1 * | 10/2005 | Wake et al. | 398/115 |
| 2006/0133733 | A1 * | 6/2006 | Koste et al. | 385/48 |
| 2006/0263012 | A1 * | 11/2006 | Yamazaki | 385/88 |
| 2008/0285980 | A1 * | 11/2008 | Nguyen | 398/141 |

OTHER PUBLICATIONS

"Photonic Power Module," Photonic Power, Mar. 2006, JDS Uniphase of Milpitas, California; p. 1.

"High Power Optical Data (HiPOD) System," Photonic Power, Sep. 2006, JDS Uniphase of Milpitas, California; pp. 1-3.

* cited by examiner

POWER OVER OPTICAL FIBER SYSTEM

BACKGROUND

1. Field

This disclosure relates to the transmission of electrical power by optical fiber. More particularly, the present disclosure describes a power over optical fiber system that provides electrical power to a remote location.

2. Description of Related Art

Prior art related to the subject matter of the present disclosure may include the following patents:

U.S. Pat. No. 5,469,523, "Composite fiber optic and electrical cable and associated fabrication method," to Blew, et al., dated Nov. 21, 1995; and U.S. Pat. No. 5,651,081, "Composite fiber optic and electrical cable and associated fabrication method," to Blew, et al., dated Jul. 22, 1997.

Other art related to the subject matter of the present disclosure may include the High Power Optical Data (HiPOD) System from JDS Uniphase of Milpitas, Calif.

SUMMARY

This summary is not intended to define the scope of invention or as a list of objects; it is for convenience. An embodiment of the present invention is a power over optical fiber transmission system comprising a transmit unit and a receive unit that are linked by optical fiber. Another embodiment of the present invention comprises a transmit unit that may be used within a power over optical fiber system. Still another embodiment of the present invention comprises a receive unit that may be used within a power over optical fiber system. In further embodiments plural pairs of transmit units and receive units are operated and connected in either parallel or series. In further embodiments each receive unit is equipped to send a feedback signal to its connected transmit unit to indicate that all optical fibers are connected. In that embodiment the transmit unit will first operate at a low power level, sufficient to provide power to operate the processor of the receive unit so that safety and operational checks can be performed. When the checks are performed satisfactorily, the feedback signal will so indicate and then the transmit unit changes to operate at a high power level so as to provide power to the location of the receive unit for use.

The invention will be better understood from the following detailed description, taken in conjunction with the accompanying drawings.

DETAILED DESCRIPTION

An embodiment of the present invention is capable of generating up to 30 mA (milliamps) of electricity at 24 volts for use with remotely deployed electrical equipment. Voltage is created by using light from two high powered lasers that travel down two optical fibers to a receiving unit that has two high power photovoltaic cells that convert the high powered laser light into usable DC voltage. One major advantage of this embodiment is that no electrical connection is required to provide electrical power to remote equipment. Hence, electrical isolation using optical fibers is achieved.

Figure 1:
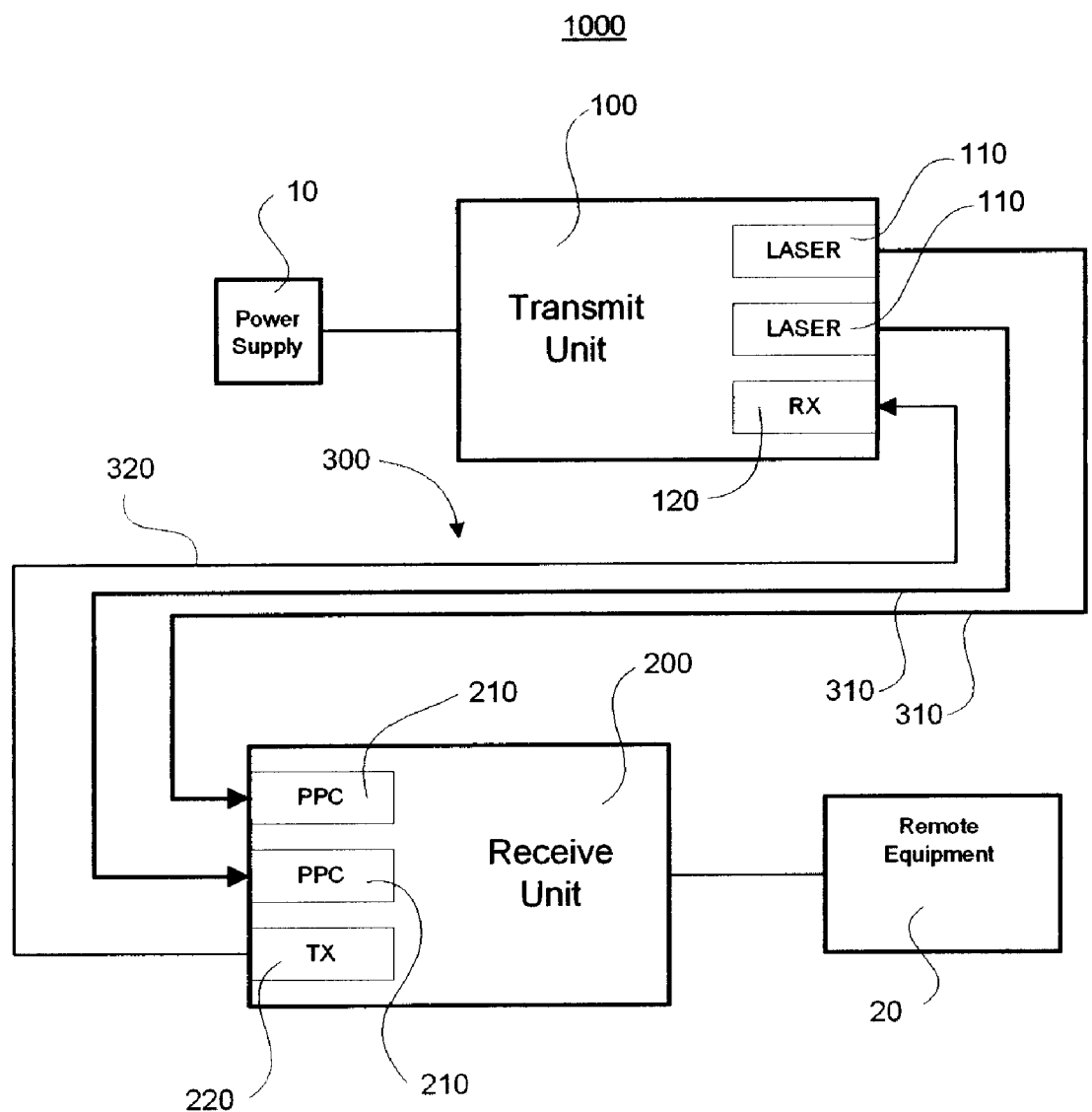
FIG. 1 is a block diagram of a power over optical fiber system according to an embodiment of the present invention.

As shown in FIG. 1, this embodiment of a power over fiber system 1000 according to the present invention comprises two devices: a laser transmit unit 100 and a receiver/voltage output unit 200. The two units are linked by optical fibers 300. The laser transmit unit 100 comprises two lasers 110 and an optical receiver 120. The lasers are of the type and specification to transmit their output into multimode fiber. The lasers 110 may comprise diode lasers, such as the 2486-L3 series high-power 2.0 W 830 nm fiber-coupled diode laser from JDS Uniphase of Milpitas, Calif. Power may be supplied to the transmit unit 100 by an external DC power supply 10. Preferably, the external DC power supply 10 provides a voltage between 24 VDC and 56 VDC. The receive unit 200 comprises two photovoltaic receivers 210 and an optical transmitter 220. The photovoltaic receivers 210 may comprise photovoltaic power converters, such as the PPC-12E 12V photovoltaic power converter from JDS Uniphase of Milpitas, Calif. Power from the receive unit 200 may be supplied to remote equipment 20. Optical fibers 300 linking the two units 100, 200 preferably comprise multimode (62.5 nm/125 nm) optical fiber, where power carrying fibers 310 link the laser 110 to the photovoltaic receivers 210 and a feedback fiber 320 links the optical transmitter 220 to the optical receiver 120.

Figure 2:
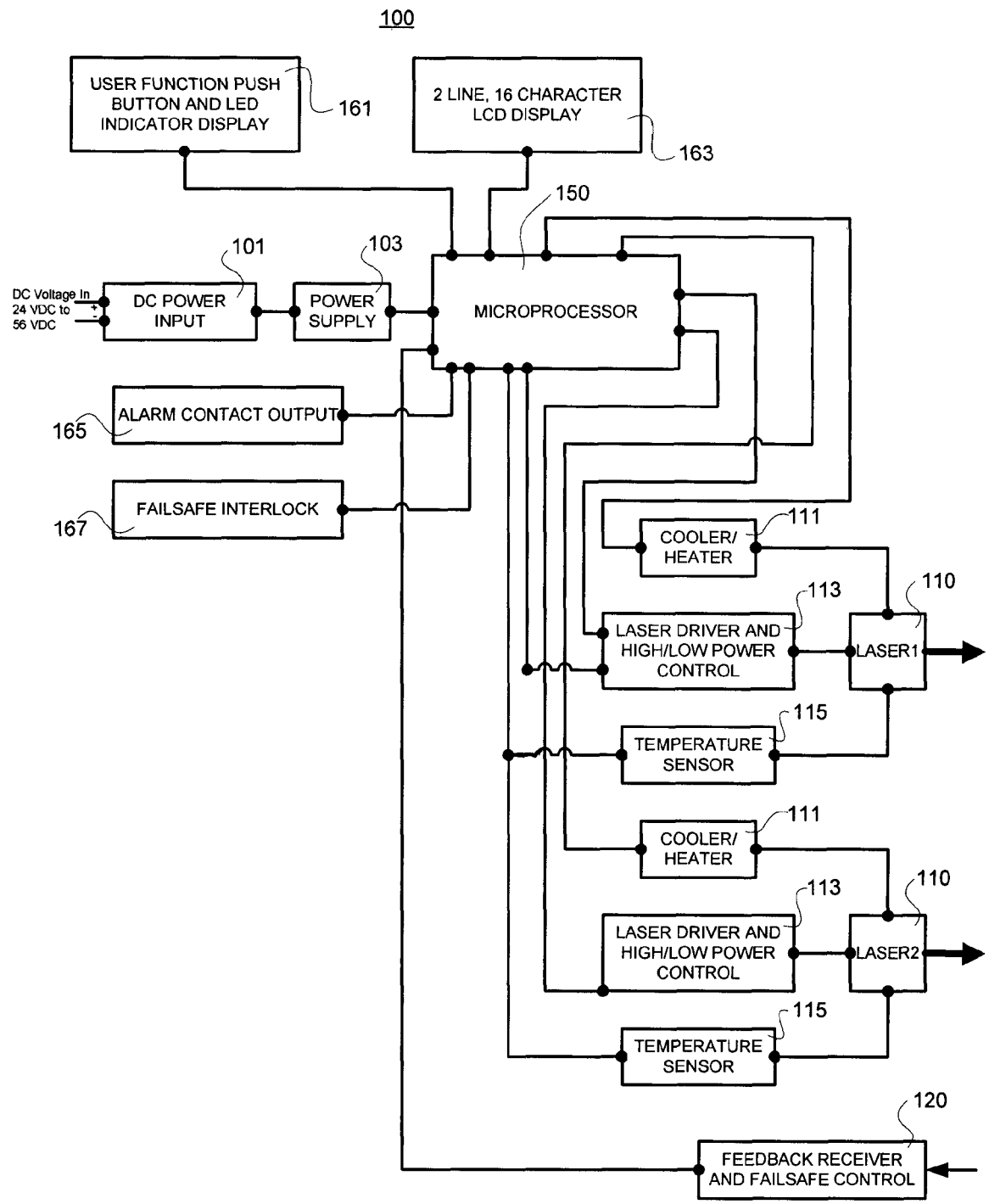
FIG. 2 is a block diagram of a transmit unit for a power over optical fiber system according to an embodiment of the present invention.

FIG. 2 shows a block diagram of the transmit unit 100 according to an embodiment of the present invention. As shown in FIG. 2, a DC voltage ranging from 24 VDC (volts direct current) to 56 VDC at 2 A (amps) is applied to the DC input 101 of the transmit unit 100 to power the unit locally. This voltage is rectified, filtered and split into 4 voltage sources by a power supply 103 for use by: a microprocessor 150 and accompanying digital circuitry; a laser voltage supply (not shown in FIG. 2); a fan voltage supply (not shown in FIG. 2); and a cooler/heater supply (not shown in FIG. 2). The microprocessor 150 may comprise a microcontroller, such as the PIC 16F685 from Microchip Technology, Inc. of Chandler, Ariz.

The microprocessor 150 provides for overall control of the transmit unit 100. The microprocessor 150 provides for user interface via indicator light emitting diodes (LEDs) and push-button interface 161, and liquid crystal display (LCD) display 163. The microprocessor 150 also receives state information from laser temperature sensors 115 and failsafe interlock 167 and provides control over an alarm contact output 165. The microprocessor 150 also processes feedback information received back from the receive unit 200 via the feedback receiver 120.

Initially, the microprocessor 150 checks that the overall state of the transmit unit 100 is safe to power up the lasers 110. The first function of the failsafe interlock 167 and microprocessor 150 is to make sure that the lasers 110 stay off while the transmit unit 100 is powering up. The transmit unit 100 may also have a lockable safety enclosure that limits access to fiber connections for the optical fibers 300. Preferably, the lockable safety enclosure completely covers the fiber connections and contains a switch that couples to the failsafe interlock, where closure of the switch indicates that the enclosure is in place and is locked. The lockable safety enclosure helps prevent users from being radiated with escaping laser energy which could cause eye or skin damage. If the lockable safety enclosure is present, the failsafe interlock 167 will prevent the lasers 110 from powering up if the enclosure is open or unlocked. Preferably, the microprocessor 150 and the failsafe interlock 167 also operate to shut down the lasers 110 if the safety enclosure is removed or unlocked while the lasers 110 are in operation. If the enclosure is open or unlocked, the LCD display 163, which is controlled by the microprocessor 150, preferably displays a message, such as "LOCAL DOOR OPEN, PLEASE CHECK," and the microprocessor 150 prevents the lasers 110 from powering up while the enclosure is open or unlocked. Also, if the enclosure is closed and locked, a "CASE INTERLOCK" LED in the LED indicator display 161 may be lit to indicate successful closure.

If the safety enclosure is closed and locked, the microprocessor 150 preferably checks the operating temperature of both lasers 110. This is done by polling the temperature sensors 115 that are configured to monitor the temperatures of the lasers 110. If the detected temperatures are within the operating range of the lasers (typically 20° C. to 45° C.), the microprocessor 150 continues the power-up sequence. If not, the microprocessor 150 turns on a thermoelectric heater/cooler 111 for the affected laser 110 and heats the laser 110 if too cold, or cools it if too hot until the laser 110 reaches the operating range. Up to this point, no laser 110 has been powered up. Preferably, each laser 110 is not powered up until the tests described above are passed.

If the safety enclosure is closed and the temperature requirements have been met, the microprocessor 150 will then pulse both lasers at low power (about ¼ the high power setting) in an attempt to receive feedback from the feedback fiber 320 from the receive unit 200. The microprocessor 150 will turn on and pulse the lasers 110 using laser drivers 113 in a low power setting. Preferably, the lasers 110 are pulsed at a rate of 50 uS (microseconds) on and 10 mS (milliseconds) off. This should give the receive unit 200 enough time to gain low power from the photovoltaic receivers 210, start the receiver unit's 200 companion microprocessor (see FIG. 3) and pulse back a status signal. This status signal is received by the transmit unit 100 by the feedback receiver and failsafe control 120 and provided to the transmit unit microprocessor 150. The purpose of this low power setting and short burst rate is to reduce the exposure to harmful infrared laser radiation. The maximum exposure at 10 cm (centimeters) is rated at 10 seconds. Therefore, if the optical fibers are not connected to the outputs of the laser 110, the microprocessor 150 will detect this condition and limit exposure to infrared laser radiation.

Preferably, a front panel laser status "TRANSMIT" LED, that is part of the LED indicator display 161, flashes during this time to indicate laser activity of low power pulsing to the receive unit 200. Also, the LCD display will display the message "NO FEEDBACK LOOP, CHECK ALL FIBERS" if no feedback signal is received from the receive unit 200. As indicated above, if there is no closed loop, the lasers 110 will never go to a higher power. Once the microprocessor 150 determines that both power carrying fibers 310 and feedback fiber 320 are connected correctly; feedback is received by the failsafe control 120; and the safety enclosure is shut, the microprocessor 150 determines that both lasers 110 are properly connected and are ready for powering up to full power.

Preferably, the temperatures of the lasers 110 are monitored before powering the lasers 110 to full power to determine that the operating temperatures of the lasers 110 are within nominal ranges. These laser temperatures are also preferably monitored during full power operation of the lasers 110. These temperatures are constantly monitored by the microprocessor 150 and temperature sensors 115. If the temperatures are detected as being outside of a preferred operating range (for example, +20° C. to +35° C.), the thermoelectric cooler/heaters 111 activate to return the temperatures to within the preferred range. If after some set time (e.g., one minute) the temperatures do not return to the preferred range, either because of failures of the thermoelectric cooler/heaters 111 or if the surrounding temperature has caused the lasers 110 to be outside their normal operating range, the microprocessor 150 will command the lasers 110 to turn off and generate either the message "EXCESSIVE HEAT, PLEASE CHECK" or "EXCESSIVE COLD, PLEASE CHECK" on the LCD display 163 (depending on the fault condition). Further, the microprocessor 150 may also cause a "HEATER" LED or "COOLER" LED on the LED indicator display 161 to flash to indicate the cause of laser power interruption. Once the laser temperatures have returned to within the preferred range, the microprocessor 150 will restart the power-up process and determine if: (1) the enclosure is open or unlocked; (2) the fibers are connected and (3) the laser temperatures are acceptable. If all three tests pass, then the microprocessor 150 will command the lasers 110 to full power again.

When the full power mode is engaged, the feedback from the receive unit 200 is constantly tested by the failsafe control 120 to see if loss of signal has occurred. Loss of signal can occur if one or more of the fibers 300 has been disconnected or has become damaged. If this condition occurs, the lasers 110 are shut down quickly before any damage can occur. Preferably, the lasers 110 shut down within 300 µS of loss of signal. Once feedback is detected by the failsafe control 120, a "RCV FEEDBACK" LED in the LED indicator display 161 may be lit to indicate successful feedback is in progress. Also, when the lasers 110 have achieved full power, the "TRANSMIT" LEDs will stay lit (instead of flashing) to show steady state operation. If any errors occur such as: safety enclosure open; feedback not found, normal temperature not achieved before operating; or if the receiver is in a test mode, an "ALARM" LED will be lit in the LED indicator display 161 to indicate the presence of one of these errors. The LCD display 163 may also display details on the error condition and report to the user where the error exists.

While the lasers 110 are operating in full power, their temperatures may vary because of operating heat. The thermoelectric cooler/heater 111 will maintain laser temperatures. When the thermoelectric cooler 111 is on to cool the lasers 110, a "COOLER" LED in the LED Display 163 may indicate that the cooler 111 is in operation. When the thermoelectric heater 111 is on to heat the lasers 110, a "HEATER" LED in the LED Display 163 may indicate that the heater 111 is in operation. When the laser temperatures reach normal, the cooler/heater 111 and associated LEDs will turn off. Further, to help the temperature of the lasers stay within normal range, a fan may be used to cool the lasers 110 and other circuitry. Preferably, this fan would stay in constant operation no matter what the operational mode of the transmit unit 100.

The LCD display 163 may also have an associated "DISPLAY MODE" pushbutton on the indicator display to allow polling of various conditions of the transmitter unit 100. Pushing the pushbutton repeatedly will scroll through various displays. For example, at any time, the temperature of both lasers 110 could be displayed by selecting this mode, in either Fahrenheit or Celsius based on user selection. Further, the microprocessor 150 may be programmed to store maximum and/or minimum temperature excursions for the lasers 110 during the operation of the transmit unit 100. The user could then select the display of these maximum and minimum temperatures on the LCD display 163, or reset the stored temperatures to have the microprocessor 150 to again store the temperature extremes seen during unit operation. During normal full power operation, another selection may display the voltage output of the receive unit 200 on the other side of the fiber optic cable 300. Hence, the feedback receiver 120 may be configured to receive status and other information from the receive unit 200 and transfer that information to the microprocessor 150. As indicated, the LCD display 163 may be configured to provide to provide a wide range of information to the user.

Preferably, the receive unit 200 has a "TEST" mode that will disconnect the receiver's output and substitute a simulated load for testing the available current of the receive unit 100. When this mode is selected on the receive unit 200, for example, via a slide switch, the transmit unit display 163 will automatically display "RCV IN TEST MODE" and the "ALARM" LED in the LED display 161 will be lit as an indication that voltage output at the receive unit 200 is off.

Any time an alarm condition occurs and the "ALARM" LED is lit, an alarm relay contact may be actuated in the alarm contact output 165 for external equipment to sense alarms. This contact 165 returns to normal conditions when the alarm indicator returns to normal.

Figure 3:
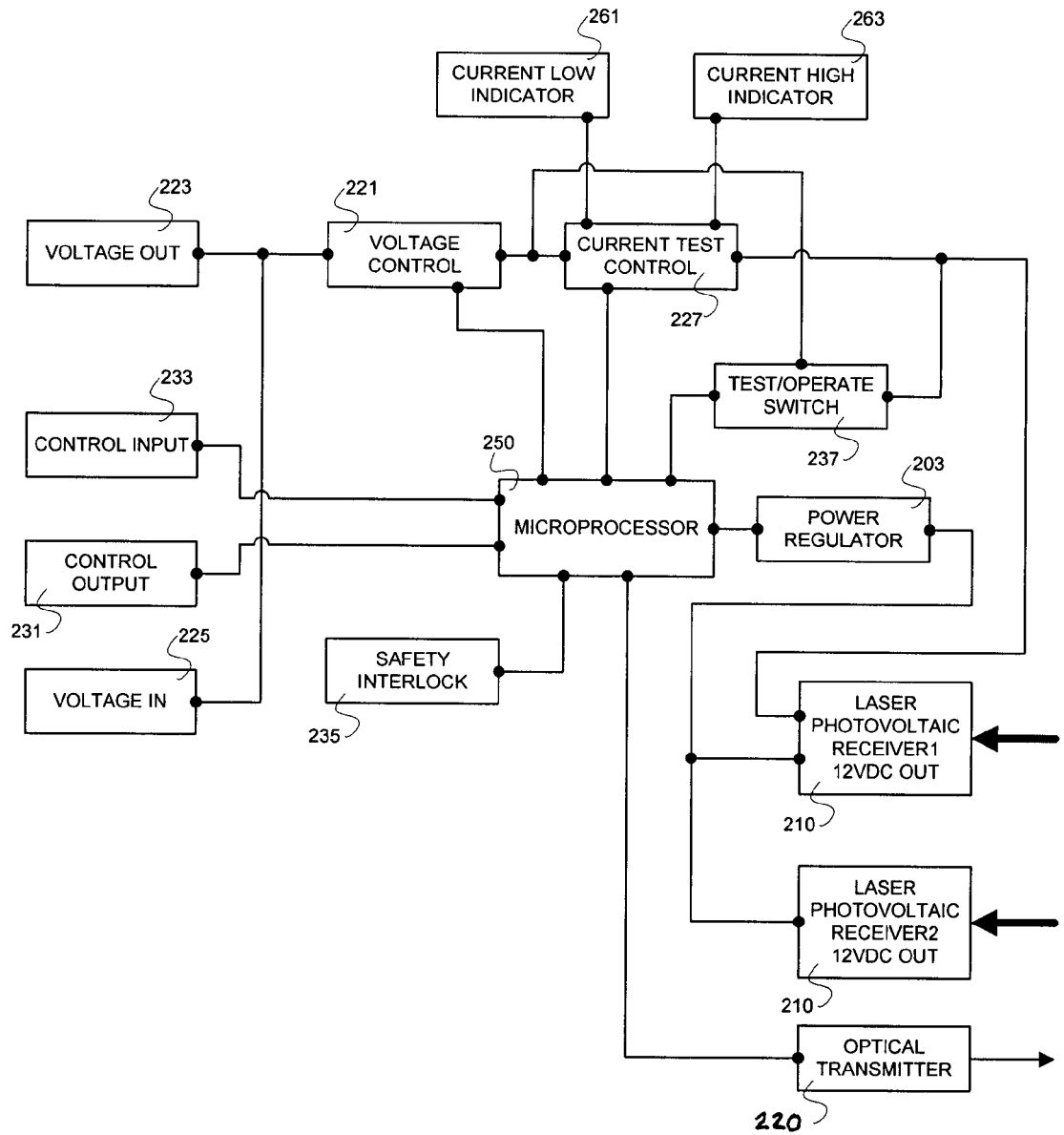
FIG. 3 is a block diagram of a receive unit for a power over optical fiber system according to an embodiment of the present invention.

A block diagram for the receive unit 200 according to an embodiment of the present invention is shown in FIG. 3. As shown in FIG. 3, laser light from the lasers 110 of the transmit unit 100 is directed into photovoltaic receivers 210. In a preferred embodiment, each receiver 210 is capable of outputting 12 VDC. One or both of the photovoltaic receivers 210 may supply power to the power regulator 203 which supplies voltage to the other circuitry of the receive unit 200. By stacking both 12 VDC photovoltaic receivers 210, the receive unit 200 is capable of producing 24 VDC.

The microprocessor 250 controls the voltage output circuit 221 to the voltage output connection 223, and turns off and on both a low current indicator ("L") 261 and a high current indicator ("H") 263 during the receive unit 200 "TEST" mode. The microprocessor 250 also controls a control output circuit 231 that may be used for "chaining" several receive units 200 together for more current or voltage, as discussed in additional detail below. The microprocessor 250 also polls the status of an interlock 235 for a safety enclosure (if used) for the receive unit 200, a "TEST/OPERATE" switch 237 and a control input circuit 233. The microprocessor may comprise a low power microcontroller, such as the PIC 16F685 from Microchip Technology, Inc. Similar to the transmit unit 100, the receive unit 200 may employ a safety enclosure to limit access to fiber connections during system operation.

When both photovoltaic receivers 210 are active, they provide power to the microprocessor. The microprocessor 250 first polls both photovoltaic receivers 210 and determines if they are both active. If they are, then the microprocessor 250 polls the safety interlock 235 and determines if the safety enclosure (if used) is closed and locked. Once this is true, the microprocessor 250 then polls to see how the "TEST/OPERATE" switch 237 is set. If the switch 237 is set to "TEST" then the microprocessor executes a TEST program for the receive unit 200.

The TEST program turns off the voltage output connection 223 and substitutes a user variable load within a current test control 227 that a user can vary to test how much current is available. Two LEDs, one labeled "GOOD" (high current indicator 263) and one labeled "BAD" (low current indicator 261) may light as the current test control 227 is changed to show how much current is available. Preferably, the current test control 227 is a potentiometer that is labeled from 12 to 30 (indicating 12 mA to 30 mA). As the setting is turned up from 12, eventually the "GOOD" LED 263 will go out and the "BAD" LED 261 will light. At this point, where the turning of the potentiometer causes this change, is where to read the labeling to know how many milliamps are available. During this time, the receive unit 200 will send a message back to the transmit unit 100 letting it know the receive unit 200 is in the test mode.

If the "TEST" mode is not selected, and the slide switch 237 is set to "OPERATE", the microprocessor 250 will then poll the control input circuit 233. When two or more receive units 200 are joined together to allow for more current or voltage, the adjoining receive unit's 200 control output circuit 231 is connected by wire to the current unit's 200 control input circuit 233. Linking the control input circuit 233 of one receive unit 200 to the control output circuit 231 of another receive unit 200 provides communication as to exactly when all receive units 200 are ready to output a voltage. When all receive units 200 are ready, they simultaneously turn on. This allows maximum power at an instant and eliminates power loss for heavier loads. If no other receive unit 200 is attached, the microprocessor 250 will see the control input circuit stay normal. If there are other receive units 200 attached via the control input circuit 233, once all receive units 200 report "ready" via this circuit 233, the microprocessor 250 will turn on the voltage control circuit 221 and power will become available at the voltage output connection 223.

Figure 4A:
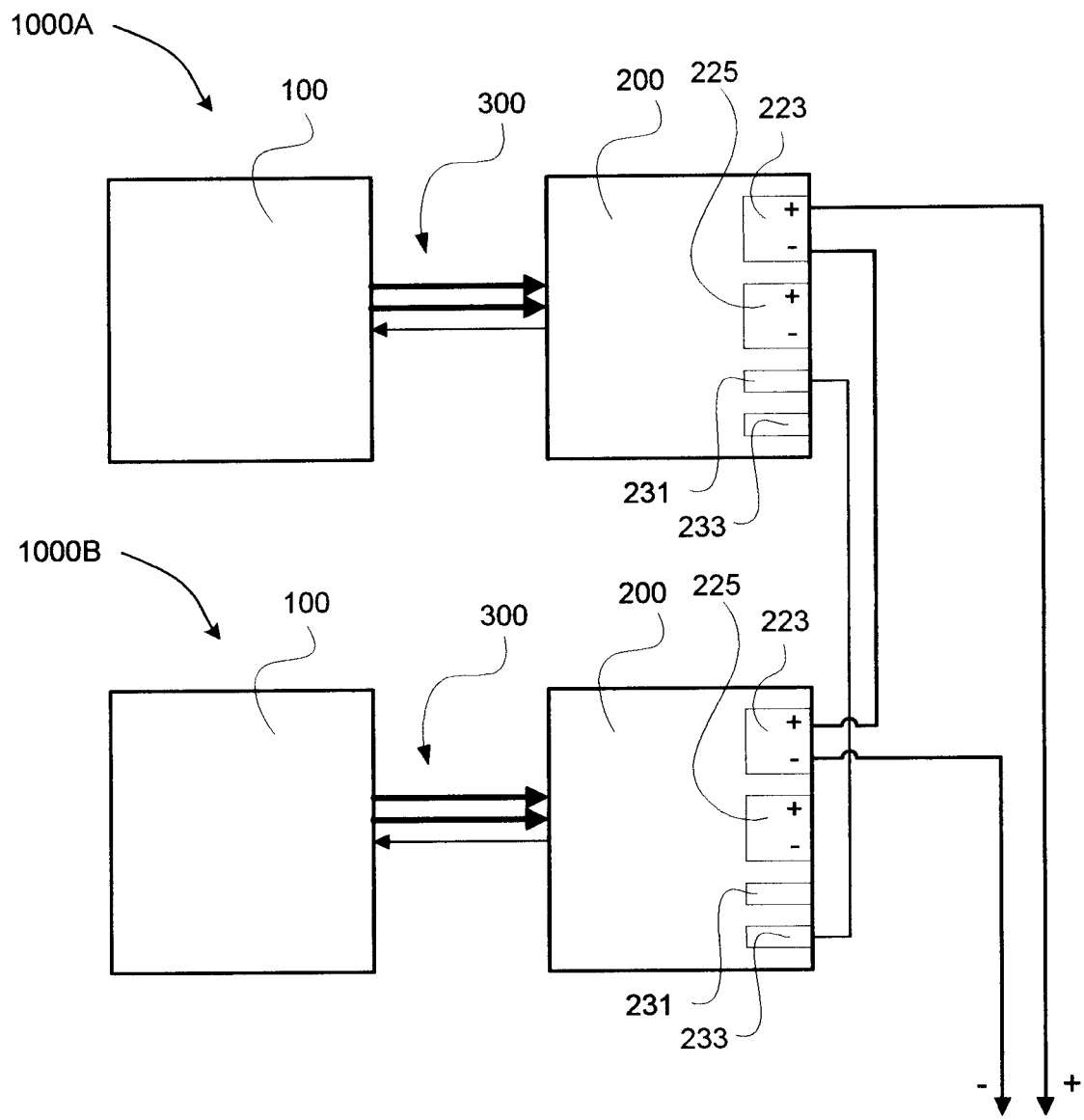
FIG. 4A is a block diagram of two power over fiber systems connected in a series configuration.
Figure 4B:
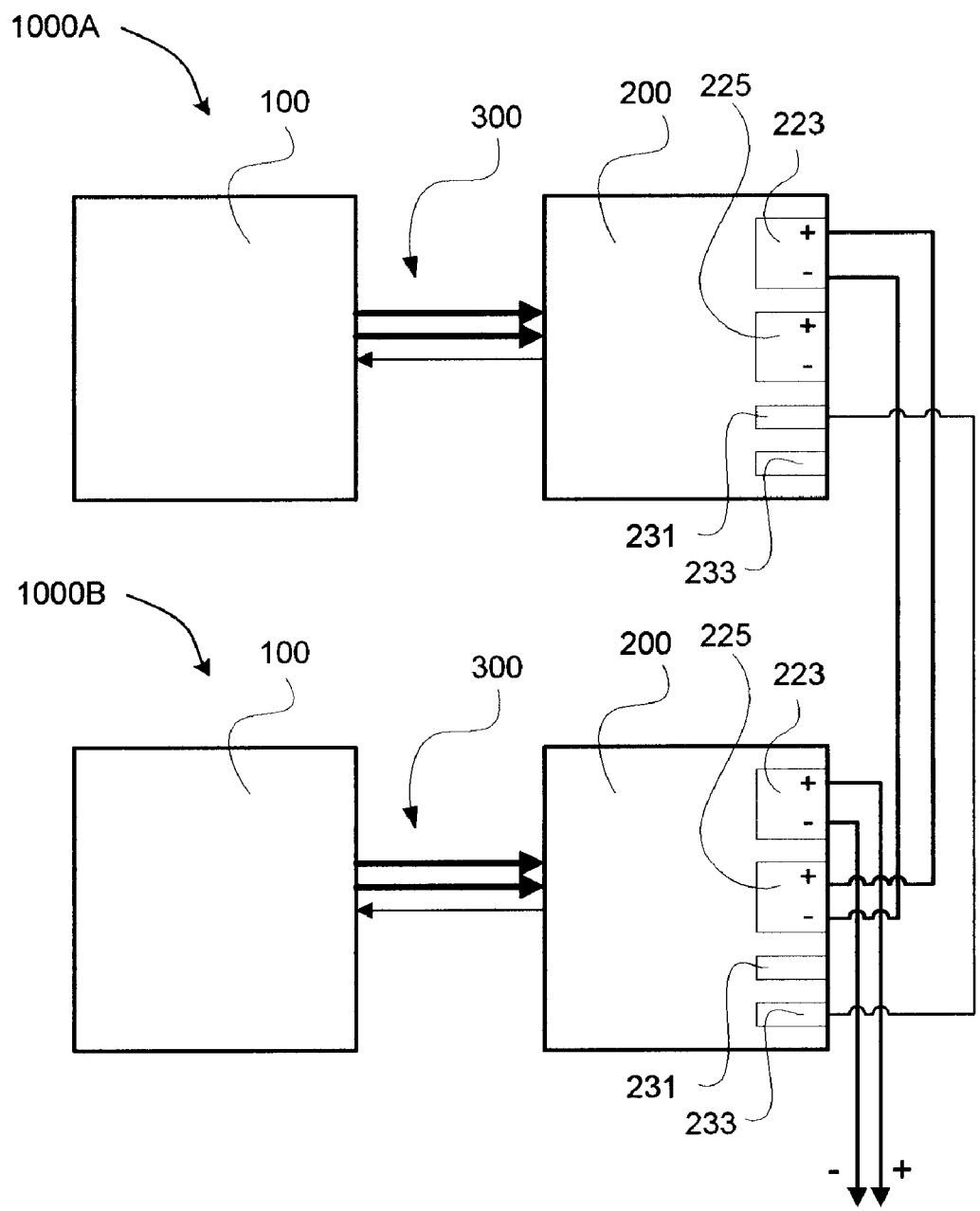
FIG. 4B is a block diagram of two power over fiber systems connected in a parallel configuration.

FIG. 4B shows an example of the connection of two power over fiber systems 1000A, 1000B in a parallel configuration to provide more current. Each system 1000A, 1000B comprises a transmit unit 100, a receive unit 200, and optical fibers 300. The voltage output connection 223 of the receive unit 200 of the first system 1000A is routed to the voltage in connection 225 of the receive unit 200 of the second system 1000B. Such a connection makes the voltage output connection 223 of the second system 1000B the primary output and provides a current that is equal to the addition of the currents available from each receive unit individually. As also shown in the FIG. 4B, the control output 231 of the first system 1000A is connected to the control input 233 of the second system 1000B to operate in the manner described above.

FIG. 4A shows an example of the connection of two power over fiber systems 1000A, 1000B in a series configuration to provide more voltage. If twice the voltage is desired, the positive pole of the voltage output connection 223 of the second system 1000B is connected to the negative pole of the voltage output connection 223 of the first system. Double the output voltage is then obtained by using the negative pole of the voltage output connection 223 of the second system 1000B and the positive pole of the voltage output connection 223 of the first system 1000A. As also shown in the FIG. 4A, the control output 231 of the first system 1000A is connected to the control input 233 of the second system 1000B to operate in the manner described above. Even more current or voltage can be obtained by combining additional power over fiber systems (each comprising a transmit unit connected to a receive unit by optical fiber) in a series or parallel configuration.

As discussed above, feedback from the receive unit 200 to the transmit unit 100 is preferably provided to allow the transmit unit 100 to go to high power. The microprocessor 250 of the receive unit 200 sends short pulses through the optical transmitter 220 back to the transmit unit 100 to indicate status of operation. If this stream of pulses is interrupted by the safety interlock 235 being tripped, or any fiber being lost or interrupted, the transmit unit 100 will fall back into the low power mode. As indicated above, the microprocessor 250 may also control the optical transmitter 220 to send status or other information back to the transmit unit 100. If the receive unit 200 has a safety enclosure for the fiber connections for the fibers 300, the stream of pulses sent back to the transmit 100 will not be sent if the receive unit safety enclosure is open or unlocked. Further, opening the receive unit safety enclosure during operation will cause the safety interlock 235 to trip and interrupt the pulses sent back to the transmit unit 100. In either case, the transmit unit 100 will then transmit laser energy only in the low power mode. The use of safety enclosures around the fiber connections at both the transmit unit 100 and the receive unit 200 and the presence and control of laser energy based on the state of those enclosures may allow the system to be considered a class 1 laser product (minimal danger to users) under industry regulations.

In a telecommunications application, the transmit unit 100 may be disposed within a housing that can be rack-mounted or wall mounted to be compatible with other telecommunications equipment. However, in other applications, other housings or form factors for the transmit unit may be used. Similarly, in a telecommunications application, the receive unit 200 may comprise circuitry disposed on a printed circuit board that can be inserted into a multiple circuit card chassis where the receive unit 200 can be used to provide power to the other cards in the chassis. Again, in other applications, other housings or form factors may also be used for the receive unit 200.

The optical fibers 300 preferably comprise 62.5/125 µm multimode optical fiber. Commercial fiber connections such as ST type fiber connectors may be used on the optical fibers 300 and at the connections to the transmit unit 100 and receive unit 200. For proper operation, care should be taken that the fiber connections at the receive unit 100 and transmit unit 200 are kept clean.

The foregoing Detailed Description of exemplary and preferred embodiments is presented for purposes of illustration and disclosure in accordance with the requirements of the law. It is not intended to be exhaustive nor to limit the invention to the precise form or forms described, but only to enable others skilled in the art to understand how the invention may be suited for a particular use or implementation. The possibility of modifications and variations will be apparent to practitioners skilled in the art. No limitation is intended by the description of exemplary embodiments which may have included tolerances, feature dimensions, specific operating conditions, engineering specifications, or the like, and which may vary between implementations or with changes to the state of the art, and no limitation should be implied therefrom. This disclosure has been made with respect to the current state of the art, but also contemplates advancements and that adaptations in the future may take into consideration of those advancements, namely in accordance with the then current state of the art. It is intended that the scope of the invention be defined by the Claims as written and equivalents as applicable. Reference to a claim element in the singular is not intended to mean "one and only one" unless explicitly so stated. Moreover, no element, component, nor method or process step in this disclosure is intended to be dedicated to the public regardless of whether the element, component, or step is explicitly recited in the Claims. No claim element herein is to be construed under the provisions of 35 U.S.C. Sec. 112, sixth paragraph, unless the element is expressly recited using the phrase "means for . . . " and no method or process step herein is to be construed under those provisions unless the step, or steps, are expressly recited using the phrase "comprising step(s) for . . . "

What is claimed is:

1. A power over optical fiber system comprising:
   a first transmit unit comprising one or more lasers, an optical receiver, and a transmit control element, wherein the transmit control element controls the output of the one or more lasers and the transmit control element is coupled to the optical receiver to receive a feedback control signal from the optical receiver;
   a first receive unit comprising one or more photovoltaic receivers, a voltage output connection, an optical transmitter, and a receive control element, wherein the receive control element is configured to enable current to be directed from the one or more photovoltaic receivers to the voltage output connection and wherein the photovoltaic receivers and the optical transmitter are configured to be connected to the one or more lasers and optical receiver via optical fiber and wherein the receive control element sends an energy received control signal to the optical transmitter when the one or more photovoltaic receivers receive optical laser energy;
   wherein the optical transmitter outputs an optical signal when the energy received control signal is generated and the optical receiver is configured to receive the optical signal from the optical transmitter and generate the feedback control signal when the optical signal is received;
   whereby laser power output by the first transmit unit is converted to electrical energy by the one or more photovoltaic receivers and the electrical energy is output at the voltage output connection of the receive unit;
   wherein the first receive unit further comprises a control output circuit and a control input circuit, the control input circuit configured to couple to the control output circuit of one or more other receive units, wherein the receive control element is configured to monitor the control input circuit to determine the status of the one or more other receive units and to determine whether to enable current to be directed from the one or more photovoltaic receivers to the voltage output connection.

2. The power over optical fiber system according to claim 1, further comprising one or more additional transmit unit and receive unit combinations, wherein each additional transmit unit and receive unit combination comprises an additional transmit unit connectable by optical fiber to an additional receive unit having a voltage output connection, wherein the voltage output connections of the first receive unit and each additional receive unit are connected in series and a control output circuit of each additional receive unit is electrically connected to the control input circuit of the first receive unit, whereby the series connection of the first receive unit and each additional receive unit provides a voltage output that is the addition of the voltage output of each receive unit.

3. The power over optical fiber system according to claim 1, wherein the first receive unit further comprises a voltage input connection coupled to the voltage output connection and the system further comprises one or more additional transmit unit and receive unit combinations, wherein each additional transmit unit and receive unit combination comprises an additional transmit unit connectable by optical fiber to an additional receive unit having a voltage input connection and a voltage output connection, wherein a control output circuit of each additional receive unit is electrically connected to the control input circuit of the first receive unit and the voltage output connection of each additional receive unit is electrically connected to the voltage input connection of another additional receive unit or the voltage input connection of the first receive unit, whereby the connection of the voltage output connection of each additional receive unit to the voltage input connection of the first receive unit or another additional receive unit provides a current output at the voltage output connection of the first receive unit that is the addition of the current output of a each receive unit.

4. The power over optical fiber system according to claim 1, wherein the transmit control element controls the one or more lasers to produce either a full power output or a low power output based on the feedback control signal.

5. The power over optical fiber system according to claim 4, wherein the transmit control element controls the one or more lasers to produce the low power output if the feedback control signal is not received from the optical receiver and the transmit control element controls the one or more lasers to produce the full power output when the feedback control signal is received from the optical receiver.

6. The power over optical fiber system according to claim 1, wherein the transmit unit further comprises a liquid crystal display showing transmit unit status messages or system status messages and/or one or more light emitting diodes showing transmit unit status or system status.

7. The power over optical fiber system according to claim 1, the transmit unit further comprising an alarm contact output, wherein the transmit control element enables the alarm contact output if the transmit control element detects an error condition.

8. The power over optical fiber system according to claim 1, wherein the first receive unit further comprises a test activation circuit, wherein the test activation circuit upon activation controls the receive control element to disable current flow to the voltage output connection and to send out a test message via the optical transmitter.

9. The power over optical fiber system according to claim 8, wherein the receive unit further comprises an adjustable current test control circuit and one or more light emitting diodes displaying current status, wherein adjusting the adjustable current test control circuit causes at least one of the one or more light emitting diodes to light to indicate the current output by the one or more photovoltaic receivers.

10. A receive unit for a power over optical fiber system, the receive unit comprising:
one or more photovoltaic receivers configured to receive optical laser energy from optical fiber;
a voltage output connection;
an optical transmitter configured to send an optical signal into optical fiber; and,
a receive control element, wherein the receive control element is configured to enable current to be directed from the one or more photovoltaic receivers to the voltage output connection and wherein the receive control element sends an energy received control signal to the optical transmitter when the one or more photovoltaic receivers receive optical laser energy;
whereby the receive unit controllably converts optical laser energy sent from a transmit unit to electrical energy for output at the voltage output connection;
wherein the receive unit further comprises a control output circuit and a control input circuit, the control input circuit configured to couple to the control output circuit of one or more other receive units, wherein the receive control element is configured to monitor the control input circuit to determine the status of the one or more other receive units and to determine whether to enable current to be directed from the one or more photovoltaic receivers to the voltage output connection.

11. The receive unit according to claim 10, wherein the receive unit further comprises a voltage input connection coupled to the voltage output connection, and the receive unit configurable to receive a current source connection to the voltage input connection to provide for an increased current output at the voltage output connection.

12. A method for transmitting electrical power over optical fiber comprising:
transmitting optical laser energy at a first power level from a transmit unit over one or more optical fibers to a receive unit said power level being sufficient to supply power to operate a microprocessor to generate a feedback signal;
transmitting a feedback signal over optical fiber from the receive unit to the transmit unit on or after receipt of the optical laser energy at the first power level at the receive unit;
in response to the feedback signal received by the transmit unit, transmitting optical laser energy at a second power level over the one or more optical fibers from the transmit unit to the receive unit on or after the receipt of the feedback signal at the transmit unit, wherein the second power level is greater than the first power level;
converting the optical laser energy at the second power level received at the receive unit to electrical energy;
wherein the transmit unit comprises a closeable enclosure partially or fully enclosing a connection between the one or more optical fibers and the transmit unit, and the method further comprises:
detecting whether the closeable enclosure is closed;
not transmitting the optical laser energy at the first power level if the closeable enclosure is not closed and the transmission has not started; and
discontinuing the transmission of optical laser energy if the closeable enclosure is not closed and the transmission of optical laser energy has started.

13. The method according to claim 12 further comprising:
monitoring the feedback signal for the presence or absence of the feedback signal; and terminating transmitting of the optical laser energy at the second power level
transmitting optical laser energy at the first power level upon detection of the absence of the feedback signal.

14. A method for transmitting electrical power over optical fiber comprising:
transmitting optical laser energy at a first power level from a transmit unit over one or more optical fibers to a receive unit said power level being sufficient to supply power to operate a microprocessor to generate a feedback signal;
transmitting a feedback signal over optical fiber from the receive unit to the transmit unit on or after receipt of the optical laser energy at the first power level at the receive unit;
in response to the feedback signal received by the transmit unit, transmitting optical laser energy at a second power level over the one or more optical fibers from the transmit unit to the receive unit on or after the receipt of the feedback signal at the transmit unit, wherein the second power level is greater than the first power level; and
converting the optical laser energy at the second power level received at the receive unit to electrical energy and
wherein the receive unit comprises a closeable enclosure partially or fully enclosing a connection between the one or more optical fibers and the transmit unit, and the method further comprises:
detecting whether the closeable enclosure is closed;
not transmitting the feedback signal if the closeable enclosure is not closed and the transmission of the feedback signal to the first transmit unit has not yet started; and discontinuing the transmission of the feedback signal if the closeable enclosure is not closed and the transmission of the feedback signal has started.

15. A method for transmitting electrical power over optical fiber comprising:

transmitting optical laser energy at a first power level from a transmit unit over one or more optical fibers to a receive unit said power level being sufficient to supply power to operate a microprocessor to generate a feedback signal;

transmitting a feedback signal over optical fiber from the receive unit to the transmit unit on or after receipt of the optical laser energy at the first power level at the receive unit;

in response to the feedback signal received by the transmit unit, transmitting optical laser energy at a second power level over the one or more optical fibers from the transmit unit to the receive unit on or after the receipt of the feedback signal at the transmit unit, wherein the second power level is greater than the first power level;

converting the optical laser energy at the second power level received at the receive unit to electrical energy;

transmitting optical laser energy at a first power level from one or more additional transmit units over optical fibers to one or more additional receive units, wherein each additional transmit unit is connected to one additional receive unit said first power level being sufficient to supply power to operate a microprocessor to generate a feedback signal;

transmitting a feedback signal over optical fiber from each additional receive unit to the additional transmit unit from which the additional receive unit is receiving optical laser energy on or after receipt of the optical laser energy at the lower power levels at each additional receive unit;

in response to the feedback signal received by the transmit unit, transmitting optical laser energy at a higher power level over the optical fibers from the one or more additional transmit units to the one or more additional receive units on or after the receipt of each feedback signal at each additional transmit unit;

converting the optical laser energy at the higher power levels received at each additional receive unit to electrical energy;

communicating a ready signal among all receive units when each receive unit is ready to output electrical energy;

outputting the electrical energy from each receive unit when the ready signal is present; and combining the outputs from each receive unit in parallel, whereby the parallel combination of the outputs provides electrical energy at a current higher than that obtained from a single receive unit output.

16. A method for transmitting electrical power over optical fiber comprising:

transmitting optical laser energy at a first power level from a transmit unit over one or more optical fibers to a receive unit said power level being sufficient to supply power to operate a microprocessor to generate a feedback signal;

transmitting a feedback signal over optical fiber from the receive unit to the transmit unit on or after receipt of the optical laser energy at the first power level at the receive unit;

in response to the feedback signal received by the transmit unit, transmitting optical laser energy at a second power level over the one or more optical fibers from the transmit unit to the receive unit on or after the receipt of the feedback signal at the transmit unit, wherein the second power level is greater than the first power level;

converting the optical laser energy at the second power level received at the receive unit to electrical energy;

transmitting optical laser energy at a lower power level from one or more additional transmit units over optical fibers to one or more additional receive units, wherein each additional transmit unit is connected to one additional receive unit;

transmitting a feedback signal over optical fiber from each additional receive unit to the additional transmit unit from which the additional receive unit is receiving optical laser energy on or after receipt of the optical laser energy at the lower power level at each additional receive unit;

transmitting optical laser energy at a higher power level over the optical fibers from the one or more additional transmit units to the one or more additional receive units on or after the receipt of each feedback signal at each additional transmit unit;

converting the optical laser energy at the higher power level received at each additional receive unit to electrical energy;

communicating a ready signal among all receive units when each receive unit is ready to output electrical energy;

outputting the electrical energy from each receive unit, when the ready signal is present; and serially connecting the outputs from each receive unit, whereby the serial combination of the outputs provides electrical energy at a voltage higher than that obtained from a single receive unit output.

17. The method according to claim 12 further comprising:
displaying the status of the transmit unit and/or the status of the receive unit.

18. The method of claim 13 further wherein upon detection of the absence of the feedback signal transmitting optical laser energy at the first power level.

19. The method according to claim 12 further comprising:
monitoring the feedback signal for the presence or absence of the feedback signal; and
terminating transmitting of the optical laser energy at the second power level upon detection of the absence of the feedback signal.

20. The method according to claim 12 wherein transmitting the optical laser energy at a first power level comprises transmitting the optical laser energy in pulses.

21. The method of claim 19 further wherein upon detection of the absence of the feedback signal transmitting optical laser energy at the first power level.

* * * * *